Nov. 15, 1966

H. H. DUNKLE 3,285,632

CONDUIT JOINT CONSTRUCTION

Filed March 9, 1964

INVENTOR.
HEBER H. DUNKLE
BY
John A. McKinney
ATTORNEY

Nov. 15, 1966    H. H. DUNKLE    3,285,632
CONDUIT JOINT CONSTRUCTION
Filed March 9, 1964    2 Sheets-Sheet 2
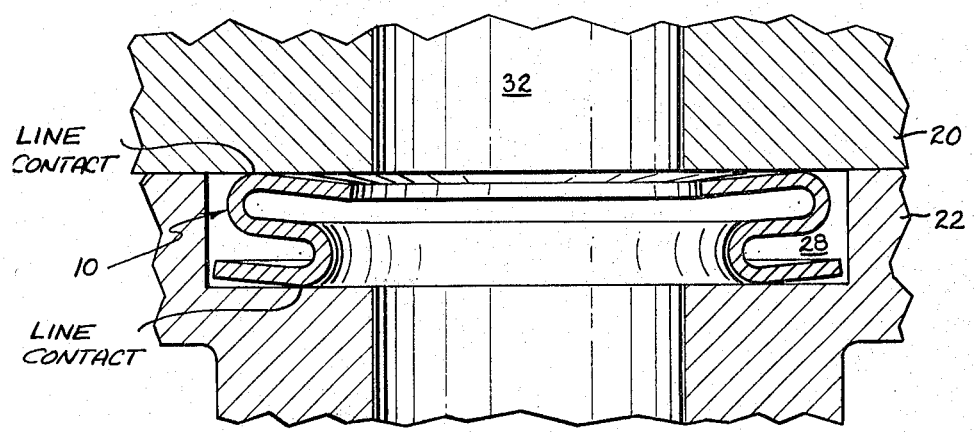
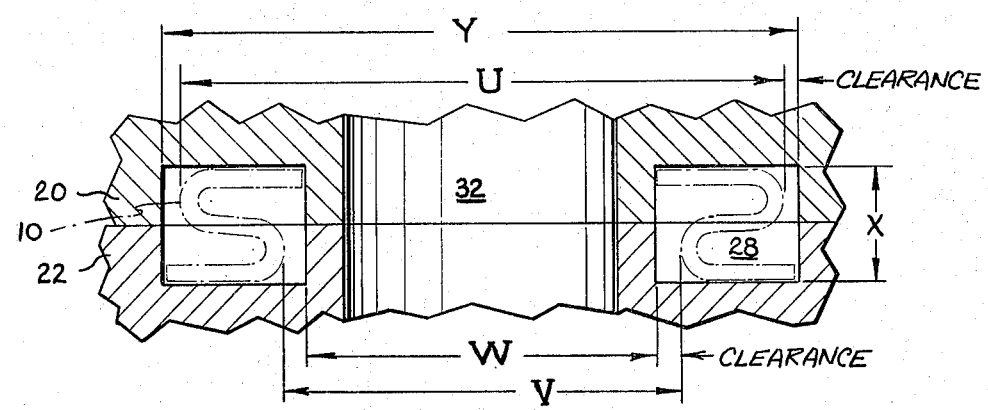
INVENTOR.
HEBER H. DUNKLE
BY
John A. McKinney
ATTORNEY United States Patent Office 3,285,632
Patented Nov. 15, 1966

3,285,632
CONDUIT JOINT CONSTRUCTION
Heber H. Dunkle, Scarsdale, N.Y., assignor to Johns-Manville Corporation, New York, N.Y., a corporation of New York
Filed Mar. 9, 1964, Ser. No. 350,234
6 Claims. (Cl. 285—363)

This invention relates generally to conduit joints and more particularly to conduit connections for systems wherein high temperatures and pressures pose problems such as in jet aircraft.

This invention is directed to an improved conduit joint, the principal advantages of which are: simplicity; provision of an all-metallic seal in an arrangement responsive to temperature and pressure changes without loss in sealing effectiveness; minimum space requirements; a reusable metallic gasket; and ease of assembly and disassembly. These advantages are of particular importance in aircraft systems where temperature and pressure conditions are encountered in which elastomers or other rubber-like materials cannot "live." Such materials soon change dimensionally, acquire permanent set and thus lose their effectiveness as seals. Also, in aircraft, space is limited and frequent servicing of equipment is necessary. In the event of failure of any valve or other components forming a part of an aircraft conduit system, it is desirable to disassemble the fluid joints with a minimum effort in a minimum time and sometimes without the need for new gaskets. Because of the space conditions, the size of components in the fluid conveying systems, including flanges and fluid joints, must be kept to a minimum but without risk of leakage in the systems.

The principal object of this invention is to provide a novel and improved gasket and flange joint construction whereby a pair of flanges are brought into axially opposed contact with each other and with an intermediate gasket to provide an efficient fluid seal which is effective under fluctuating temperature and/or pressure conditions.

It is a further object of this invention to provide a fluid joint construction having improved sealing characteristics in minimal space.

Toward the attainment of the foregoing objects, the invention contemplates a fluid joint embodying the combination of a pair of peripheral conduit flange portions defining a chamber adapted to receive a gasket, which flange portions also have opposed mating surfaces when assembled under axial tightening or compression, by suitable securing means such as bolts; and a relatively thin, in axial width, resilient metallic gasket of generally S or Z shaped cross-sectional configuration disposed in said recess in a manner whereby the portions of the gasket intermediate the axial ends thereof are out of contact with the adjacent surfaces of the said flange portions and are thus free for axial movement.

Prior devices have utilized generally S-shaped metallic member (British Patent No. 840,220) as components in a conduit joint. These members serve as carriers for rings of non-metallic resilient and compressible material and spring load the rings or else are permanently deformed to distort the rings whereby they are forced into contact with the surfaces to be sealed.

In contrast, the generally S-shaped member of the instant invention, per se, serves as the sealing element or gasket in an arrangement wherein it is free to respond to thermal and pressure changes and maintain its sealing efficiency.

S-shaped metallic gaskets are also used in connection with spark plugs for combustion engines. However, these gaskets are of relatively soft material and rely upon permanent deformation to establish a sealing engagement. After the initial tightening of the spark plug, and subsequent operation of the engine which causes its components to expand and/or contract, the sealing engagement relation of the spark plug gasket with the spark plug is disrupted and can only be re-established by further tightening or take-up of the spark plug with the threaded hole of the engine block.

The gasket forming a part of the instant invention is particularly adapted for use in an arrangement wherein axial take-up of mating flange portions is limited or restricted to the extent that such take-up cannot be relied upon and hence, otherwise, the sealing effectiveness would be lost. The gasket of the instant invention is constructed of metal which is sufficiently strong to resist permanent deformation but yet is sufficiently resilient to maintain sealing engagement with the walls defining the axial ends of the recess in which the gasket is positioned.

The invention will be further explained in the following description taken in connection with the accompanying drawing where like numerals are used to designate the same or similar parts, but with suffixes added to indicate modifications, throughout the several figures of the drawing:

FIG. 5 is an enlarged schematic view of a pair of flanges with a gasket (shown in phantom lines) to illustrate the important relative dimensions; and FIG. 6 is an enlarged view of an alternate form of gasket with fragmentary portions of a pair of flanges.

Figure 1:
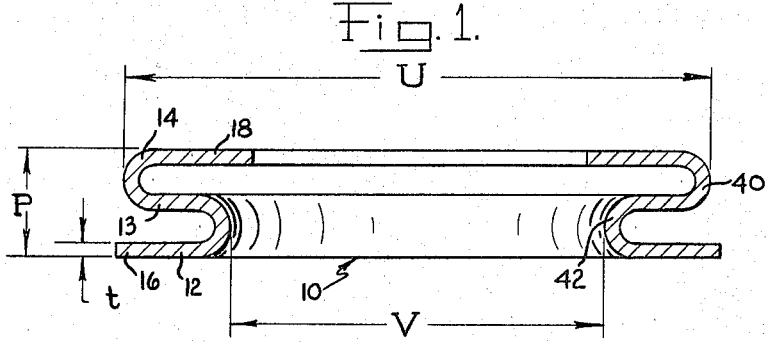
FIG. 1 is an enlarged cross-sectional view of the metallic gasket forming a part of this invention.

Referring to FIG. 1, there is shown an annular gasket, generally designated by the numeral 10. It will be understood that the gasket 10 may have a configuration, when viewed in a plane normal to a plane extending through the central axis, other than circular. In any event, the cross-sectional configuration of the gasket 10 when viewed in a radial plane is generally in the form of a Z or S. The radial cross-sectional configuration of the preferred embodiment may be more aptly described as being Z-shaped, rather than S-shaped, because the radial legs 12 and 14 terminate with tangent and generally straight portions 16 and 18, respectively. However, the term "S-shaped" as used throughout this description and the appended claims is intended to include both generally S and Z shaped gaskets. The preferred axial thickness P of gasket 10 in an uncompressed state is at least equal to five times the thickness $t$ of the metal from which the gasket 10 is fabricated. Although some stretching of the metal may occur in some sections during the gasket forming operation, as shown in FIG. 1, the thickness of the gasket is substantially uniform throughout the sinuous length of the gasket. Since the gasket 10 is to be incorporated in joint seal construction which are particularly adapted for use at elevated temperatures, 600° F. and greater, and/or elevated pressures, 1000 p.s.i. and greater, the preferred metals for the gasket 10 are of the stainless steel types, and particularly those metals having a Rockwell B hardness of at least 75.

The various types of stainless steels have been recognized as standard by the American Iron and Steel Institute (AISI) as to composition and each has been assigned a categorical number. The type designated as 316 has been found to be admirably suited for use in making gaskets of this invention for use with fluid temperatures as high as 800° F. Other types of steels that are recommended for elevated temperature conditions may include the following:

| Temperature, ° F. | Type Steel |
| --- | --- |
| 800 | 304SS |
| 1600 | 347SS |
| 2000 | Inconel |
| 2000 | Inconel X |

The sealing effectiveness of the gasket 10 may be enhanced by plating the surfaces of the gasket which establish the sealing contact with silver or other temperature resistant materials which will produce a smooth surface finish. In one embodiment of gasket fabricated from 316SS and silver plated, the gasket was tested and found to provide an effective seal when subjected to a temperature of 1760° F. and to 1000 p.s.i. pressure.

The selection of gasket material and the relationship of the gasket with the coacting elements of the fluid joint are important in establishing and maintaining the resiliency of the gasket. The generally S-shaped configuration enhances the resiliency of the metal, which metal is selected because of its ability to resist permanent deformation at elevated temperatures.

In each of the illustrated embodiments of fluid joint, the gasket 10 is subjected to limited axial compression. The flanges, generally designated throughout the figures by the numerals 20 and 22 are in axially opposed relation and have mutually contacting portions 24 and 26. The flanges 20 and 22 may form an integral part of tubes, pipes, and the like, or may be suitably secured, as by welding, to any conduit. Also, the flanges 20 and 22 may form elements of components, such as valve bodies, of a fluid conveying system. The terms "flange" and "flanges" as employed in this specification and the appended claims are intended to include the terminal end faces of any such conduits or components which establish metal-to-metal mutual contact when assembled.

Figure 2:
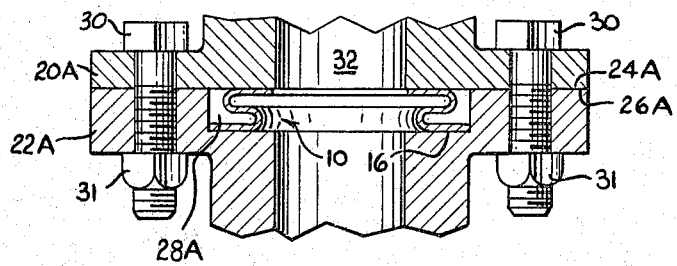
FIG. 2 is a view of the gasket of FIG. 1 shown in assembled relation with a pair of flanges wherein one of the flanges is released to define an interiorly unconfined gasket chamber.

In FIG. 2, the gasket 10 is shown to be disposed in chamber 28A, defined by flange 20A. The flanges 20A and 22A define faces 24A and 26A, respectively, which are in mutual engagement. The flanges 20A and 22A are secured together by suitable means, such as by bolts 30 and nuts 31. In the arrangement of FIG. 2, the inner diameter of the chamber 28A is not confined, i.e., the chamber is open to the fluid passage 32.

Figure 3:
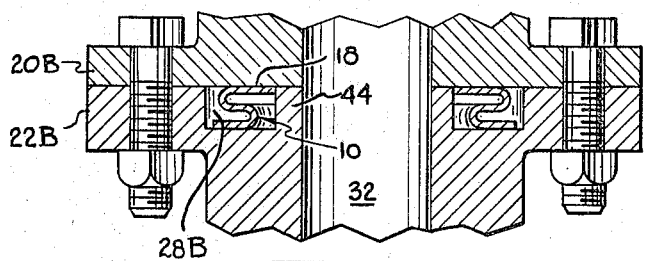
FIG. 3 is a view similar to FIG. 2 but with one of the flanges recessed to define a confined gasket chamber.

The combination illustrated in FIG. 3 is similar to that shown in FIG. 2, except that the gasket 10 is totally confined, is not exposed, in chamber 28B defined by flange 22B.

Figure 4:
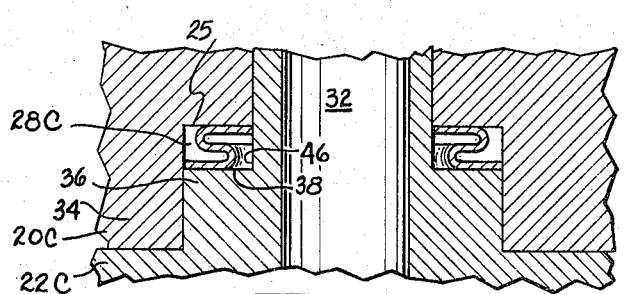
FIG. 4 is a view similar to FIG. 2 but with the chamber being defined by both flanges.

In FIG. 4, a combination is illustrated wherein the chamber 28C may be considered to be defined partially by each of the flanges 20C and 22C. The length of the portion which may be termed an axial projection 34 of flange 20C is sufficiently longer than the complementary axial projection 36 of flange 22C so that when the flanges 20C and 22C are assembled the recess or chamber 28C is defined between the sub-face portion 25 of flange 20C and the sub-face portion 38 of flange 22C.

In each of the embodiments, the axial width X of the chamber 28 and its relation with the axial width of the gasket 10 is critical and forms an important aspect of this invention. The preferred axial width X is less than the free expanded width P of the gasket but greater than three times, most preferably at least five times, the thickness $t$ of the metal from which the gasket 10 is formed. Such a relation permits a combination wherein the resiliency of the gasket metal may be relied upon to establish metal-to-metal sealing engagement, one wherein the gasket metal will not be permanently deformed, and one wherein the generally radial legs 12, 13 and 14 are not compressed to the extent that their axial faces contact each other.

Another important aspect of this invention is the relative radial dimensions of the gasket 10 and the chamber 28. The outer diameter Y of the chamber 28 is larger than the outer diameter U of the outermost convex portion 40 of the gasket 10 in those embodiments wherein the basket 10 is confined exteriorly. In those embodiments where the gasket 10 is confined interiorly, the inner diameter V of the concave portion 42 of the gasket 10 is larger than the diameter W confining inner wall portion 44. Additionally, in order to definitely position the gasket 10 within the recess, one or both of the radial legs 12 and 14 may be lengthened to extend slightly beyond the corresponding and respective convex portion 40 and concave portion 42 to substantially correspond to the diameters of the respective walls. The leg 13 serves to join and radially space the convex portion 40 with the concave portion 42. It will be apparent from FIG. 1, and from FIG. 6, that the axially remote outer curved portions of convex portion 40 and concave portion 42 each lie in separate planes, each of which is normal to the central axis of the gasket and tangent to the respective concave or convex portion. Thus, these planes define the free expanded axial width P of the gasket. In FIG. 1, the outer remote portions of leg portions 16 and 18 are illustrated as being coincident with said planes. In FIG. 6, the leg portions 16 and 18 divert toward each other but yet are wholly within said axial width. FIG. 2 illustrates the manner in which the leg 16 is extended to sufficiently correspond to the outer diameter Y of the chamber 28 to definitely position the gasket 10. FIG. 3 illustrates the manner in which the leg 18 is extended to sufficiently correspond to the inner diameter W of the chamber 28 to definitely position the gasket 10. FIG. 4 illustrates the manner in which both legs 16 and 18 may be extended to substantially correspond to diameters Y and W, respectively. The provision of the clearance between the convex portion 40 and the wall 44 and between the concave portion 42 and wall 46 and the definite positioning of the gasket 10 within a chamber 28 deters the possibility of frictional interference of the convex portion 40 and the concave portion 42 with the walls of the chamber 28 as the flanges 20 and 22 respond to temperature and pressure changes and the gasket 10 correspondingly changes in axial width to continuously maintain sealing engagement with the flange faces 24 and 26.

As indicated previously, it is preferred to employ a relatively hard gasket metal, those having a Rockwell B hardness of at least 75, most preferably at least 80 (either initially or after forming) to resist permanent deformation. It is also preferred that the gasket display good compressibility and recovery characteristics which may be calculated as follows:

Compressibility, $\% = P - M/P \times 100$
Recovery, $\% = R - M/P - M \times 100$ where:
$P$ = initial thickness
$M$ = compressed thickness under total load
$R$ = recovered thickness In the combination of this invention, it is preferred to employ metal gaskets which can be compressed axially at least 20%, more preferably at least 25%, and which can recover at least 10%, more preferably at least 15%, when the compressibility and recovery characteristics are calculated in accordance with the above formulae.

To further disclose and point up this invention, the following data for five series of gaskets that have been made and tested for compressibility and recovery is submitted. All of the gaskets tested were fabricated from .019 thick ($t$) Type 316 stainless steel and compressed from the nominal gasket thickness (P) to a nominal compressed thickness (M) of .075 inch. The figures in the following table represent the average for the gaskets tested in each series.

| Gasket | U | V | P | M | R | Recovery, percent | Compressibility, percent | Max. Load, lbs. | Av. lbs./in. at $U - \frac{U-V}{2}$ |
|---|---|---|---|---|---|---|---|---|---|
| I | 1.046 | .844 | .100 | .0745 | .0785 | 15.7 | 25.5 | 1,433 | 482 |
| II | 1.234 | 1.031 | .102 | .073 | .078 | 17.2 | 28.4 | 1,833 | 516 |
| III | 1.609 | 1.406 | .102 | .074 | .081 | 25 | 25.4 | 2,200 | 466 |
| IV | 2.359 | 2.156 | .102 | .073 | .080 | 24.1 | 28.4 | 2,850 | 403 |
| V | 2.734 | 2.531 | .102 | .0735 | .084 | 36.9 | 27.4 | 3,000 | 363 |

These tests illustrate the remarkable ability of the specially fabricated metallic gaskets to recover from compression loads. The data also shows that as the gasket size increases, the less compressible the gasket becomes with increasing loads. It is important to control the compression load because a point may be reached where the gasket may suddenly and continuously yield without further increasing the load.

Because metallic gaskets require more loading to compress as the gaskets increase in diameter size, in the present invention, it is preferred to provide an arrangement as shown in FIG. 6 wherein the axial faces of the gasket make essentially line contact with the axial walls 24 and 26 defining the chamber 28. With such an arrangement, the unit bolt load or compressive stress (lbs./sq. in.) on the gasket is increased when compared with arrangements wherein surface contact is established between the sealing member and related components of a fluid joint under the same total bolt loading conditions.

Having provided a complete description of the invention in such a manner as to distinguish it from other inventions and from what is old, and having provided a description of the best mode presently contemplated of carrying out the invention, the scope of patent protection to be granted is defined by the following claims.

What I claim:
1. A fluid joint comprising in combination:
 (a) a pair of opposed flange members, at least one of said flange members having a recessed portion cooperating with other of said flange members to provide radial and axial wall portions of a chamber for receiving a gasket;
 (b) an annular metallic gasket having a generally S-shaped configuration when viewed in cross-section from an axile plane and including:
  convex and concave portions, in respect to the central axis of said joint, said concave and convex portions having their axially remote outer curved portions each lying in a separate plane normal to said central axis and tangent to the respective concave and convex portions, said planes defining the free expanded axial width of said gasket,
  with a first end leg extending radially inward from said convex portion and being within said axial width of said gasket such that initial contact, of said first leg with its respective radial wall portion of said chamber, is at least at the axially remote outer curved portion of said convex portion,
  with a second end leg extending radially outward from said concave portion and being within said axial width of said gasket such that initial contact, of said second leg with its respective radial wall portion of said chamber, is at least at the axially remote outer curved portion of said convex portion;
 (c) a central portion joining and radially spacing said concave and said convex portions;
 (d) positioning means for positioning said convex and said concave portions of said gasket in spaced relation with the axial extending surfaces of said wall portions; and
 (e) securing means for securing said flange members in mutually face-to-face axial relation.

2. A fluid joint as described in claim 1, wherein said positioning means comprises an extension of said second end leg from the concave portion extending generally radially outward beyond the convex portion.

3. A fluid joint as described in claim 1, wherein: said positioning means comprises an extension of said first end leg from the convex portion extending generally radially inward beyond the concave portion.

4. An annular gasket, of relatively hard metal and of substantially uniform thickness throughout, having a generally S-shaped configuration when viewed in cross-section from an axile plane, and including:
 (a) concave and convex portions, in respect to the central axis of said gasket, said concave and convex portions having substantially equal radii and having their axially remote outer curved portions each lying in a separate plane, each plane being normal to said central axis and tangent to the respective concave and convex portions, said planes defining the free expanded axial width of said gasket;
 (b) a first end leg extending radially inward from said convex portion and being within said axial width of said gasket such as to adapt said first leg for initial contact, with a wall portion of a chamber in which said gasket is to be installed, at least at the axially remote outer curved portion of said convex portion;
 (c) a second end leg extending radially outward from said concave portion and being within said axial width of said gasket such as to adapt said second leg for initial contact, with a wall of said chamber, at least at the axially remote outer curved portion of said concave portion;
 (d) a central portion joining and radially spacing said concave and convex portions; and
 (e) positioning means formed by extending at least one of said first and second legs from its respective concave or convex portion sufficiently radially beyond the adjacent convex or concave portion to radially space at least one of said concave and said convex portions out of contact with axial wall portions of said chamber when installed therein.

5. A gasket as described in claim 4, wherein said positioning means is formed by so extending the leg from said concave portion.

6. A gasket as described in claim 4, wherein said positioning means is formed by so extending the leg from said convex portion.

References Cited by the Examiner

UNITED STATES PATENTS

| | | |
|---|---|---|
| 1,824,422 | 9/1931 | Badger _____ 285—302 |
| 2,641,381 | 7/1953 | Bertrand. |
| 3,012,802 | 12/1961 | Waite. |
| 3,058,750 | 10/1962 | Taylor. |
| 3,114,471 | 12/1963 | Kropfl. |
| 3,192,690 | 7/1965 | Taylor _____ 277—205 |

FOREIGN PATENTS

| | | |
|---|---|---|
| 181,041 | 2/1955 | Austria. |
| 595,332 | 9/1925 | France. |
| 869,453 | 3/1953 | Germany. |
| 493,575 | 10/1938 | Great Britain. |
| 712,786 | 7/1954 | Great Britain. |

CARL W. TOMLIN, *Primary Examiner.*

R. GIANGIORGI, *Assistant Examiner.*